Feb. 24, 1970   J. COOPER   3,496,674
TRACK AND VEHICLE COMBINED WITH VEHICLE ACTUATED SIGNAL MEMBER
Filed Sept. 8, 1967   2 Sheets-Sheet 1
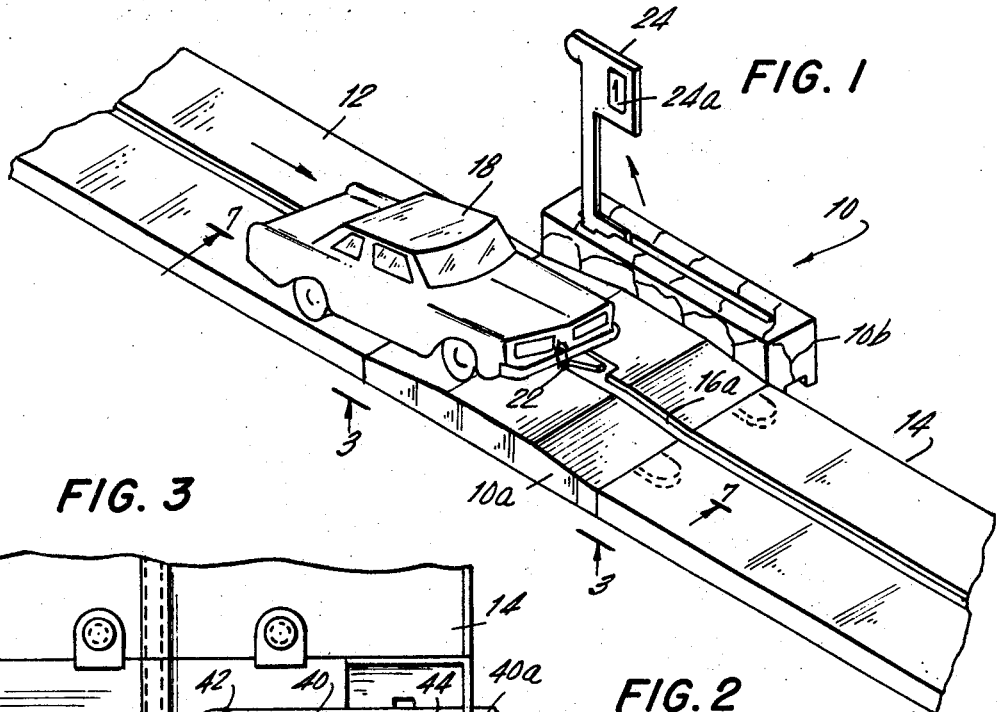
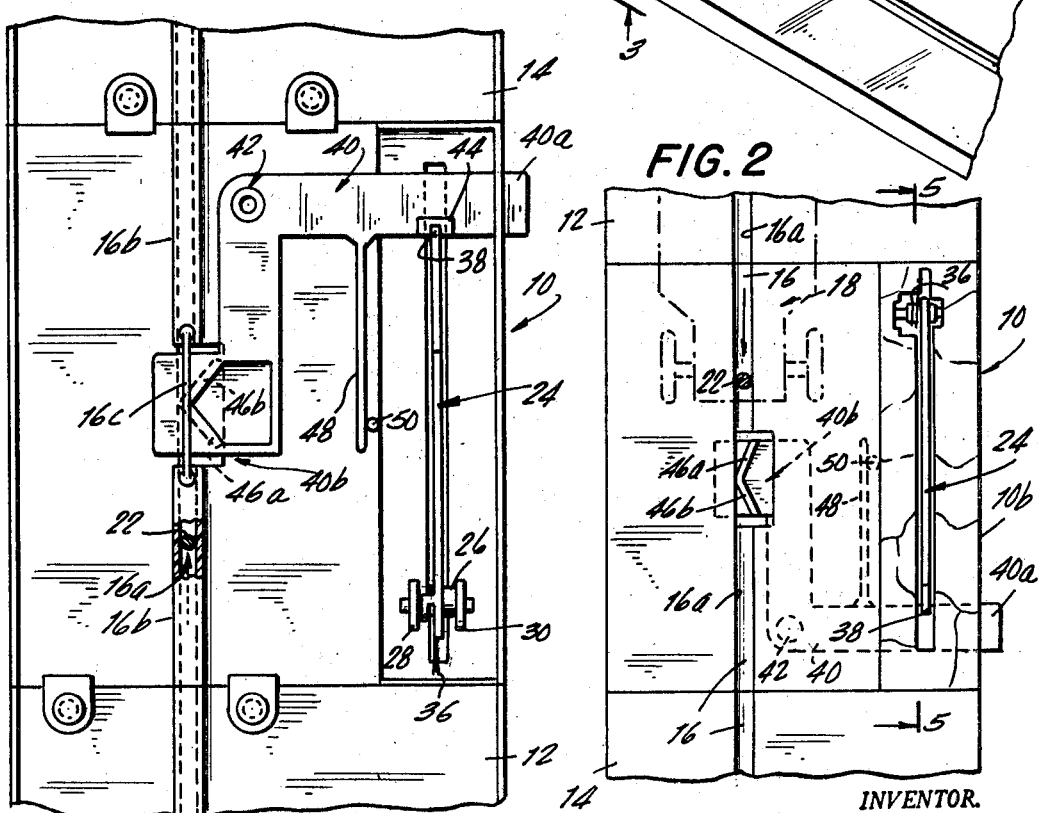
INVENTOR.
JULIUS COOPER
BY
Amster & Rothstein
ATTORNEYS

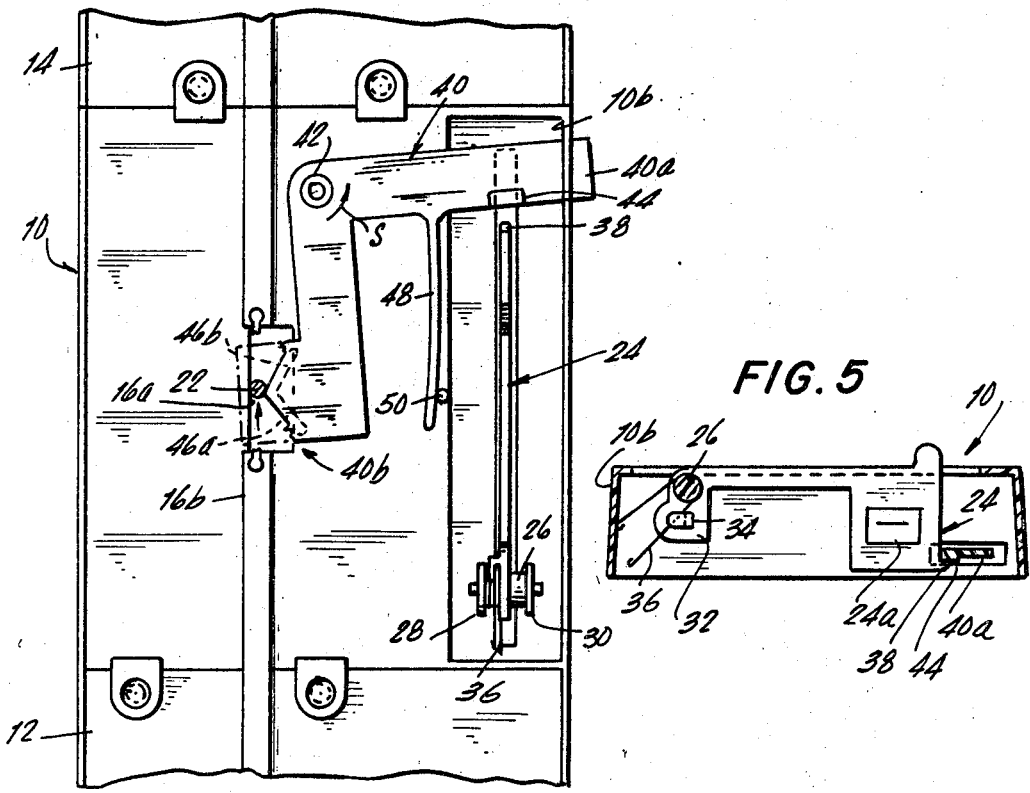
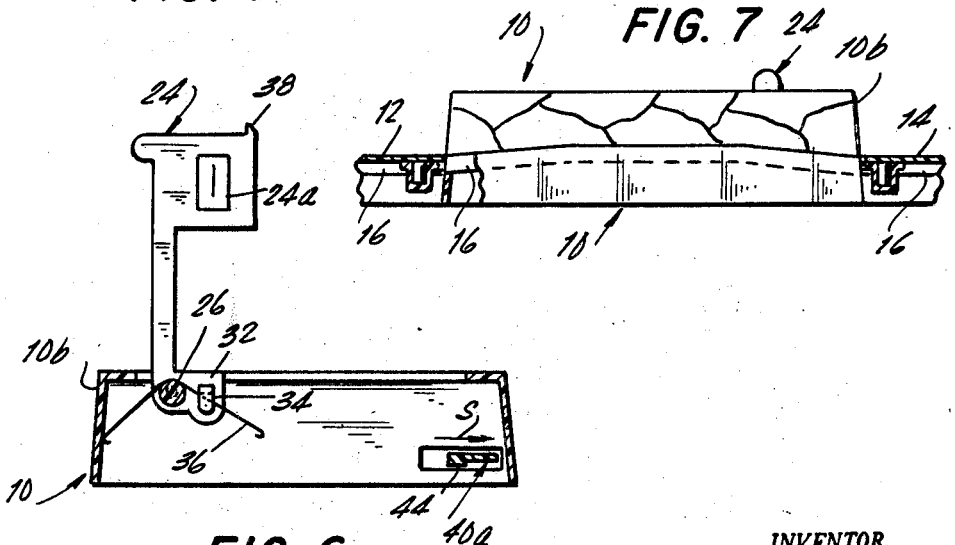

United States Patent Office 3,496,674
Patented Feb. 24, 1970

3,496,674
TRACK AND VEHICLE COMBINED WITH VEHICLE ACTUATED SIGNAL MEMBER
Julius Cooper, New Hyde Park, N.Y., assignor to Ideal Toy Corporation, Hollis, N.Y., a corporation of New York
Filed Sept. 8, 1967, Ser. No. 666,332
Int. Cl. A63h 17/14
U.S. Cl. 46—243    3 Claims

ABSTRACT OF THE DISCLOSURE

An accessory track unit for use with an interconnected track having a closed main guide groove therein of the type used with one or more battery-operated vehicles having a depending guide which engages the guide groove to steer the vehicle about the track, wherein the accessory track unit has a signal member which, in practice, is released for movement from a hidden, storage position into a raised signal position, this release being caused by the vehicle moving an actuating member as it moves across the accessory track unit.

---

The present invention relates generally to toy tracks for battery-operated vehicles, and more particularly to an accessory track unit having a moving part which is released for movement in response to vehicle movement on the track to thereby increase the play value of the product.

The track hereof is of the type comprised of interconnected units defining therealong a continuous main guide groove and used with battery-operated vehicles having guide pins extending into and engaging the guide groove to steer the vehicles along the track. This type track is a very important product because of its popularity. It does require, however, auxiliary or accessory units, otherwise the repititious running of the vehicles along the track can become monotonous. Thus, there is a constant need for these accessory units, particularly such units that have an automatic mode of operation initiated, preferably, by the vehicles themselves, are easily incorporated in the overall track system, and are capable of being economically mass produced.

Broadly, it is an object of the present invention to provide an improved accessory track unit meeting the foregoing and other desirable commercial requirements and effectively increasing the play value of the track. Specifically, it is an object to provide a track unit which simulates the flag signals that are provided during actual racing; the vehicle, as it progressively makes its way around the track, causing the raising of flags at selected check points along the track.

An accessory check point track unit demonstrating objects and advantages of the present invention includes a body having formed therein a continuation of the main guide groove, a signal member movable between a hidden, storage position and a raised signal position and normally under spring bias to make this movement, and an actuating member cooperation with both the signal member and the vehicle operating in the guide groove to produce signal member movement. Adjacent one end the actuating member releasably latches the signal member in its hidden, storage position and adjacent its other end extends into the guide groove so as to be struck by the moving vehicle and in this way cause the unlatching of the signal member.

The above brief description as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of the check point accessory traack unit hereof in its operative position connected to cooperating track units of a toy vehicle track;

FIG. 2 is a plan view of the accessory track unit, in which an exemplary toy vehicle operating thereon is shown in phantom perspective;

FIG. 3 is an enlarged plan view of the track unit, as seen from below, illustrating further structural details thereof, particularly of an actuating member of the unit;

FIG. 4 is a view similar to FIG. 3, illustrating the actuating member in its positions of movement at the start and end of an actuating stroke thereof;

FIG. 5 is an elevational view, in section taken on line 5—5 of FIG. 2, illustrating structural features and the storage position of the signal member of the accessory track hereof;

FIG. 6 is a sectional elevational view, similar to FIG. 5, illustrating the signal member in its raised signal position; and FIG. 7 is an elevational view, in section taken on line 7—7 of FIG. 1, illustrating further structural details of the accessory track unit.

Reference is now made to the drawings, and in particular to FIG. 1, illustrating an auxiliary track unit, generally designated 10, of the present invention. The track unit 10 is illustrated in an assembled condition with additional track units 12 and 14 connected fore and aft to it; all units (of which only units 10, 12 and 14 are shown for brevity's sake) cooperating to form a continuous track system having a closed guide groove 16. The length portion of this closed guide groove 16 which is formed in the body 10a of the track unit 10 is designated 16a. As generally understood, one or more battery-operated vehicles, such as the vehicle 18, operates on the track and has a depending guide 22 mounted on its front end which engages with the guide groove 16, 16a to steer the vehicle about the track. The accessory track unit 10 hereof increases the play value of the track by serving as a check point at which a signal member 24 thereof moves from a hidden, storage position within the body 10a, as depicted in FIG. 7, into a raised signal position, as depicted in FIG. 1; this movement of the signal member 24 occurring as a result of movement of the vehicle 18 over the track unit 10, all as will be subsequently described in detail. Thus, the track system comprised of the interconnected tracks, exemplified by the track units 10, 12 and 14, will be understood to include a number of the accessory track units 10, appropriately spaced along the track, each successively numbered with a numbered decal 24a or the like and, as a consequence, each in a position to be successively actuated by the vehicle 18 as it progressively makes its way around the track, thereby resulting in the successive raising of the numbered signal members 24 of the units 10. This simulates the signaling procedure, used during actual racing, of a flag signal being given at various check points along the race course as a racing vehicle passes these points.

To function in the manner just generally described, the check point accessory track unit, as exemplified by the track unit 10 hereof, includes an enclosure 10b formed along one side of the body 10a and defining therein a storage compartment for the signal member 24. Specifically, the member 24 is formed in the shape of a flag and, at its base, is pivotally mounted on a transversely and integrally molded shaft 26 mounted for pivotal movement in depending wall sections 28 and 30, as clearly shown in FIG. 3. Means are provided for biasing said signal member toward signal position. At the base of signal member 24, as best shown in FIGS. 5, 6, there is a lateral extension 32 molded with a grip 34 which, in practice, engages one arm of a spring 36, coiled at its medial section about the pivot shaft 26, and terminating in a second arm which bears against one of the vertical walls of enclosure 10b. Thus, the two arms of the spring 36 are placed under compression when the signal member 24 is in its hidden, storage position, as depicted in FIG. 5, and by virtue of this compressed condition normally exerts a spring bias on the signal member 24 to move into its FIG. 6 raised signal position. An additional significant structural feature of the signal member 24 is a latching lip 38 located in the upper right hand corner of the portion of this member which simulates a flag.

Cooperating with the signal member 24 is an actuating member, generally designated 40, the body of which generally has an L-shape and is preferably fabricated as an injection molded plastic article of manufacture. As may be best understood from FIGS. 3 and 4, the actuating member 40 is appropriately pivotally connected, as at 42, on the underside of the body 10a in an operative position where it has one leg 40a extending across the path of movement of the signal member 24 and a base portion 40b on its other leg located immediately below the guide groove segment 16a, the actuating member being moveable about the pivot 42 through an unlatching stroke S.

Formed on the leg 40a, and more particularly at a location which intersects the path of movement of the signal member 24, is a latching shoulder 44 which, in practice, is adopted to engage the previously noted latching lip 38 on the signal member 24 to thereby releaseably hold the signal member 24 in its hidden, storage position within the storage enclosure or compartment 10b. On the opposite end 40b of the actuating member 40, and more particularly on the side thereof which directly communicates with the guide groove segment 16A, there is an upstanding pair of intersecting walls 46a and 46b which are each arranged at an angle, but in opposite directions, to the longitudinal axis of the guide groove 16a. Thus, regardless of which direction the vehicle 18 is traveling along the guide groove 16a, the depending guide 22 on the front end of the vehicle will strike either the wall 46a or the wall 46b and, as a consequence, actuate the actuating member 40 through its unlatching stroke S about the pivot 42.

Completing the construction of the actuating member 40 is a comparatively thin extension or member 48 which, at its free end, bears against depending element or stop 50. Thus, when the actuating member 50 is actuated through an unlatching stroke S, as illustrated in FIG. 4, one result is of course to move the unlatching shoulder 44 free of engagement with the latching lip 38 so that the signal member 24, under the urgency of the spring 36, is moved from its storage position into its raised position; another result is that the extension 48, held at its free end by the stop 50 from moving, is slightly bent, as illustrated in FIG. 4, and thus functions as a spring to produce an urgency biasing the member 40 to return back into its normal or at-rest position of FIG. 3. This spring urgency, of course, is a function of the resiliency of the plastic material of construction of the member 40.

As best shown in FIG. 3, the guide groove 16, 16a is formed as the opening of a depending channel 16b molded along the underside of the track units 10, 12 and 14. The channel 16b is continuous except at the location where it is intersected by the actuating member section 40b. At this intersection, the discontinuation in the channel 16b is preferably bridged by a connecting section 16c, accommodating thereunder the section 40b and serving, in an obvious manner, to hold the section 40b in place while not interfering with unlatching strokes S thereof.

What is claimed is:

1. In combination, a track comprised of interconnected track units defining therealong a continuous closed guide groove for operating a battery-operated vehicle thereon, a vehicle, said vehicle having a depending guide adapted to engage with the surfaces of said guide groove to steer said vehicle about said track, an accessory track unit connected in said track comprising a body having formed therein a length segment of said guide groove, a signal member pivotally mounted within said body for movement between a storage position within said body and a raised signal position relative thereto indicating movement of said vehicle over said accessory track unit, means, including a spring, for biasing said signal member toward said signal position, and an actuating member for said signal member arranged on said body and extending between said signal member and said guide groove, said actuating member being pivotally mounted in said body, one end of said actuating member having latching means adjacent said signal member for releasably holding said signal member in said storage position, the other end of said actuating member having switch means thereon, said switch means comprising a pair of walls disposed in opposing angular directions to the longitudinal axis of said guide groove and extending into said guide groove, whereby said depending guide of said vehicle contacts said switch means during movement of said vehicle along said guide groove causing the rotation of said pivotally mounted actuating member and the unlatching of said signal member and movement thereof into said raised signal position.

2. The combination of claim 1 wherein said actuating member includes means for opposing the rotation of said actuating member, said means comprising a comparatively thin extension on said member held against movement at its free end and adapted to produce a spring urgency to the extent of the resiliency in the material of construction thereof.

3. The combination of claim 1 including wall means forming an enclosure defining a storage compartment for said signal member and having an opening therein through which said signal member is movable to attain said storage and signal positions thereof.

References Cited

UNITED STATES PATENTS

| 3,228,600 | 1/1966 | May | 273—86 X |
| 3,315,632 | 4/1967 | Hyden | 273—86 X |
| 3,376,844 | 4/1968 | Wood | 273—86 X |

FOREIGN PATENTS

| 1,237,545 | 6/1960 | France. |
| 1,102,022 | 3/1961 | Germany. |
| 1,049,247 | 11/1966 | Great Britain. |

F. BARRY SHAY, Primary Examiner

U.S. Cl. X.R.

46—202; 116—132; 273—86